(12) United States Patent
Wheeling et al.

(10) Patent No.: US 6,189,424 B1
(45) Date of Patent: Feb. 20, 2001

(54) LOADER AND UNLOADER FOR MACHINE TOOL

(75) Inventors: William George Wheeling, Indianapolis; Anthony Wayne Melton, Greenfield; David Frederic Hiatt, Cicero; Stephen Kinsen Leo, Indianapolis, all of IN (US)

(73) Assignee: Visteon Global Technologies, Inc., Dearborn, MI (US)

( * ) Notice: Under 35 U.S.C. 154(b), the term of this patent shall be extended for 0 days.

(21) Appl. No.: 09/339,480

(22) Filed: Jun. 24, 1999

(51) Int. Cl.[7] ........................................... B23B 1/00
(52) U.S. Cl. ....................... 82/1.11; 82/124; 82/127; 82/129
(58) Field of Search ............................. 82/124, 126, 125, 82/127, 129, 1.11, 120, 121

(56) References Cited

U.S. PATENT DOCUMENTS

| | | | |
|---|---|---|---|
| 3,937,331 | * 2/1976 | Spercel | 82/126 X |
| 4,316,398 | 2/1982 | Link et al. | 82/125 |
| 4,680,896 | * 7/1987 | Breitenstein et al. | 51/215 |
| 4,794,831 | * 1/1989 | Cheng | 82/124 X |
| 5,505,584 | 4/1996 | Berns | 414/745.1 |
| 5,662,014 | * 9/1997 | Link | 82/127 X |
| 5,715,735 | 2/1998 | Alden et al. | 82/124 |
| 5,911,804 | * 6/1999 | Haller et al. | 82/127 |

* cited by examiner

Primary Examiner—Henry Tsai

(57) ABSTRACT

Loader and unloader mechanism (10) for a machine tool having a workpart-holding spindle (14) wherein a workpart load tube (32) and unload tube (34) and associated workpart loading fluid cylinders (40, 42) are arranged relative to a tool-carrying turret (20) in a manner that workparts (W) are fed to the spindle (14) through the load tube (32) and removed from the spindle after machining to a workpart holder (33) on the tool-carrying turret (20), which then positions the workpart holder between an unloading tube (34) and a workpart unloading fluid cylinder (76) where the workpart is ejected from the workpart holder into the unload tube.

10 Claims, 6 Drawing Sheets

LOADER AND UNLOADER FOR MACHINE TOOL

BACKGROUND OF THE INVENTION

1. Field of the Invention

The invention relates to a workpart loader and unloader mechanism for a machine tool. 2. Description of Related Art Computer numerical controlled (CNC) lathes are known having a rotatable spindle with a collet chuck to grip a workpart to be machined and having a workpart loading/unloading tube communicated to a rear of the spindle collet chuck such that a workpart can be fed through the tube to the spindle chuck where it is machined and then unloaded from the spindle collet chuck back through the same loading/unloading tube. Such a workpart loader and unloader mechanism for a spindle collet chuck is disadvantageous in that the cycle time to load, machine, and unload a workpart is relatively lengthy.

An object of the invention is to provide a workpart loader and unloader mechanism for a machine tool, such as a CNC lathe, that reduces the cycle time to load, machine and unload workparts relative to a workpart-holding spindle of the machine tool.

SUMMARY OF THE INVENTION

A loader mechanism pursuant to the invention includes a load tube that communicates to a spindle having a workpart holding chuck and first and second workpart loading fluid cylinders for moving a workpart to be machined to a first axial position relative to the spindle to eject a previously machined workpart therefrom and then to a second final axial position in the spindle where the workpart to be machined is positioned for machining. The first and second fluid cylinders comprise relatively long and short stroke fluid cylinders to this end with the long stroke cylinder mounted on a slide that is moved axially by the short stroke cylinder. The load tube preferably comprises an air manifold through which the workparts are successively fed to the spindle with the manifold having one or more air discharge orifices through which pressurized gas is discharged toward the spindle to prevent dirt, machining chips, and the like from entering the load tube.

An unloader mechanism pursuant to the invention includes a tool-carrying turret having a workpart holder thereon with the turret being axially movable and rotary indexable to a first turret position to receive a machined workpart ejected from the collet chuck by movement of a workpart to be machined at the first axial position in the spindle and to a second turret position where the machined workpart in the workpart holder is ejected into an unload tube by a third workpart unloading fluid cylinder.

The arrangement of the load and unload tubes and turret workpart holder to transfer a machined workpart from the spindle to the unload tube, while a workpart to be machined is positioned in the spindle for machining reduces cycle time to load, machine, and unload any given workpart.

DETAILED DESCRIPTION OF THE PREFERRED EMBODIMENT

Figure 4:
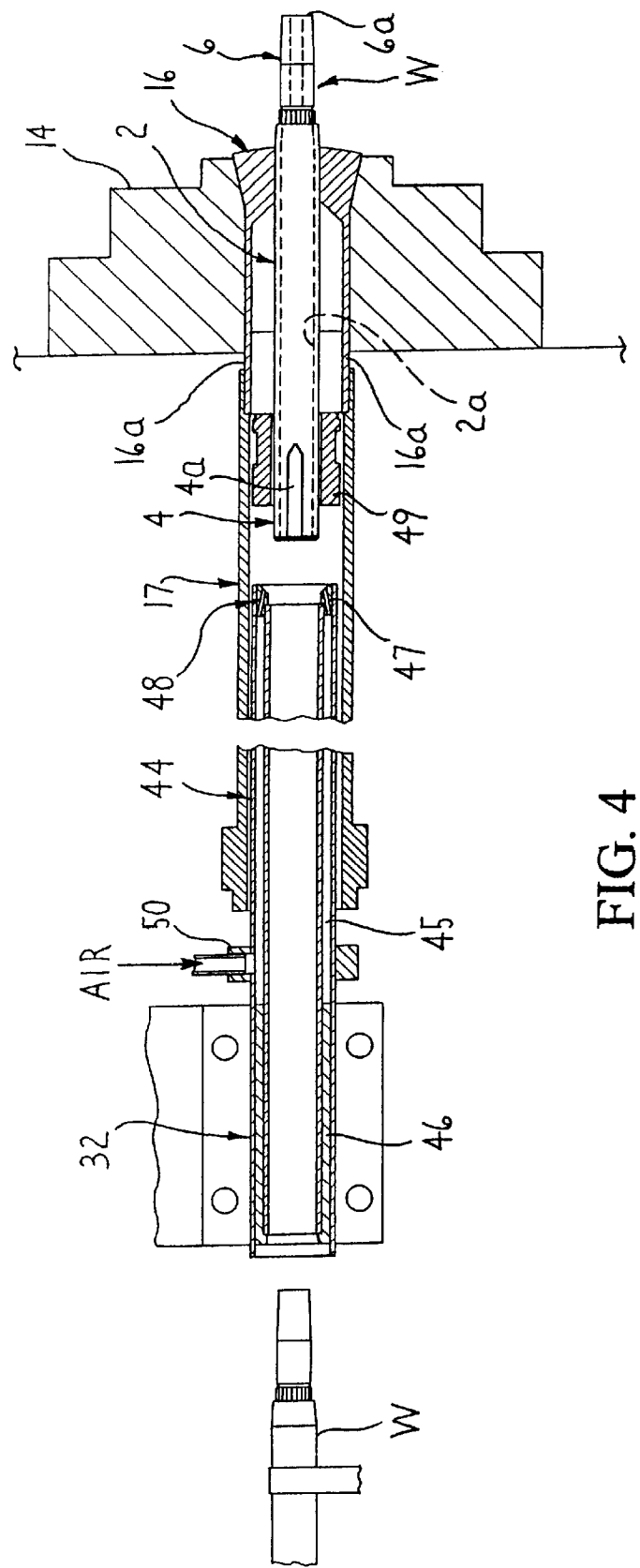
FIG. 4 is a partial longitudinal sectional view through the lathe spindle and the load tube.
Figure 5A:
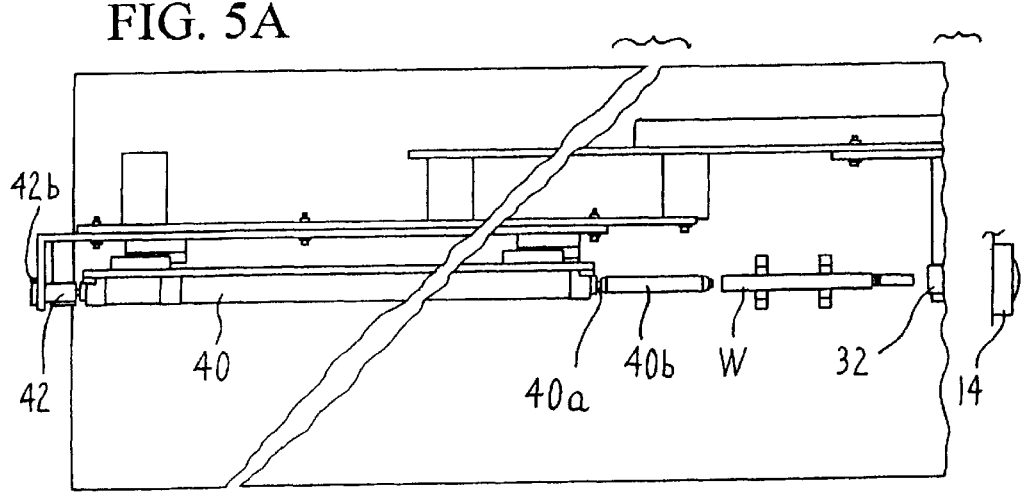
FIGS. 5A, 5B, and 5C are plan views showing the sequence of movements of the long and short stroke workpart load cylinders and long cylinder slide to eject a machined workpart from the collet chuck and then position a workpart to be machined in the collet chuck.
Figure 5B:
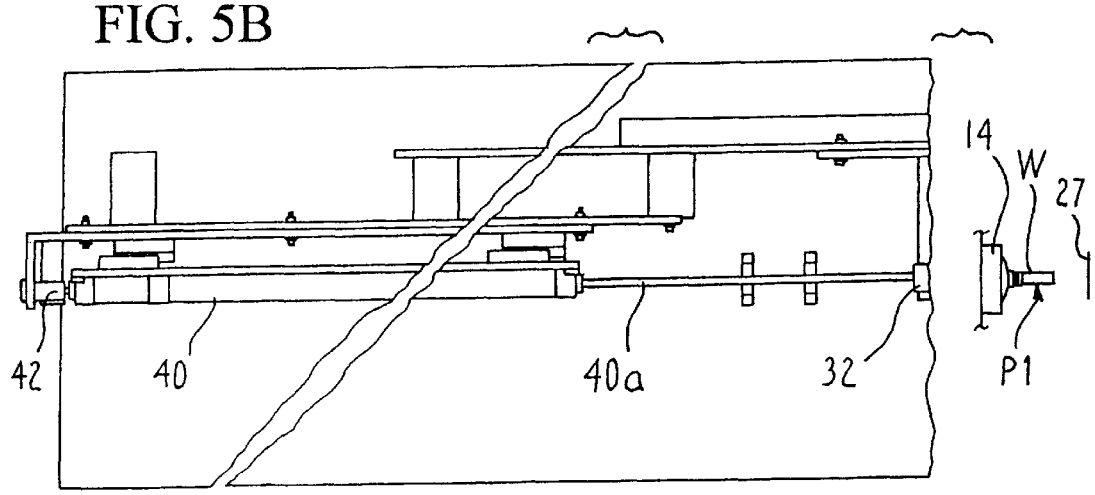
Figure 5C:
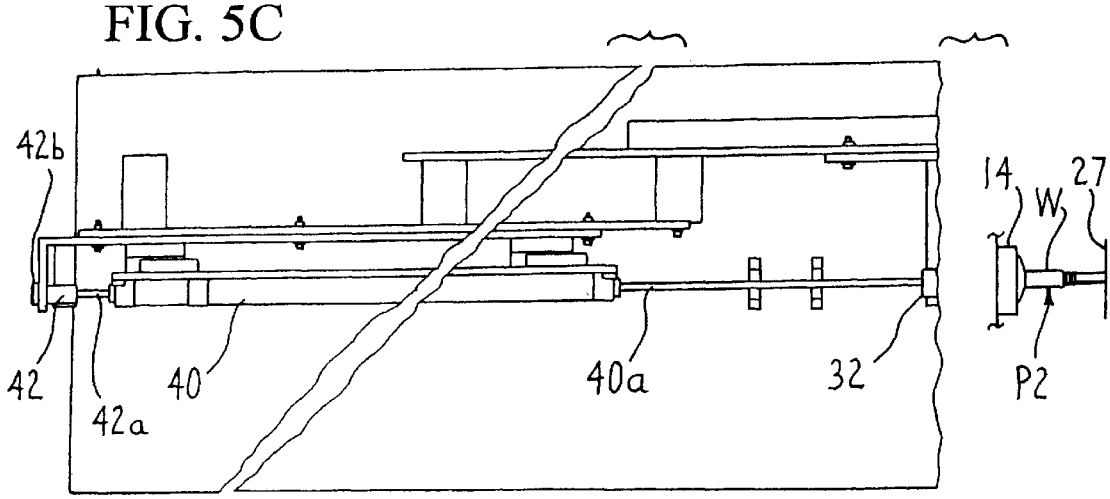

Referring to FIGS. 1–6, a loader and unloader mechanism 10 for a machine tool is illustrated. The machine tool is shown for purposes of illustration, and not limitation, as a CNC lathe 12 having a workpart-holding spindle 14 that is rotatable by a suitable spindle motor (not shown) located in the lathe housing 15 where a belt drive (not shown) connects it to the spindle. As shown in FIG. 4, the spindle 14 includes a collet chuck 16 (e.g. a serrated collet chuck) having multiple collet fingers 16a that grip a workpart W to be machined and a spindle tube (draw tube) 17. The collet fingers 16a are opened and closed relative to the workpart by a hydraulic collet closer.

The workparts W are shown for purposes of illustration, and not limitation, as steering shaft spindles having a cylindrical shank 2 with internal passage 2a between a relatively large diameter end 4 with flats 4a on opposite sides and a reduced diameter end 6 having axial end face 6a. The end 6 is adapted to be machined by a drill and countersink tool T1 and tapping tool T2 held in respective tool holders H1 and H2 on a ram turret 20 of the lathe. The ram turret 20 is mounted on a slide 22 on a base B1 of the lathe for movement axially toward and away from the chuck 16 and also is rotatable about axis AT by a suitable spindle motor (not shown) located in housing 24. The lathe also includes a main rotary turret 25 rotatable about axis d on turret housing 25a that is movable in the directions shown by arrows in FIG. 1 and carries one or more form, spline, cut-off or other machining tools (not shown) as well as spring stop 27 shown schematically in FIGS. 5B, 5C. A single spindle CNC lathe having the spindle, spindle motor and belt drive, hydraulically actuated collet chuck, main and ram turrets, and other features described above is available as model #CS51 from Hardinge Incorporated, 1 Hardinge Drive, Elmira, N.Y. 14902-1507.

The loader and unloader mechanism 10 pursuant to an embodiment of the invention includes a workpart load tube 32 and unload tube 34 arranged relative to tool-carrying turret 20 in a manner that workparts to be machined W are fed in succession to the rear of the spindle 14 through the load tube 32 and removed from the front of the spindle after machining to a workpart-receiving holder 33 on the tool-carrying ram turret 20, which then is rotatably indexed to position the machined workpart W' for unloading to the unloading tube 34.

The loader mechanism 30 includes a base B2 that can be wheeled to position it in proper relation to the lathe 12. The base B2 includes support frame 36 that supports load tube 32 in coaxial alignment and in cantilevered manner in spindle tube 17, FIG. 4, so that workparts to be machined W can be fed through the load tube 32 into the collet chuck 16 for gripping by collet fingers 16a and machining by the tools T1, T2 on the turret 20. The frame 36 includes a cantilevered frame section 36a to which the load tube 32 is fastened by a bracket 39.

The support frame 36 includes an upright L-shaped frame member 36b that supports a pair of ball slides 38a on which slide 38 is disposed for axial movement. A relatively long stroke (e.g. 47 inch stroke) fluid cylinder 40 (e.g. pneumatic cylinder) is disposed on slide 38 and includes an axially movable piston rod 40a and workpart-engaging nosepiece 40b that is sized, shaped and aligned to enter the passage 2a at the rear end 4 of the workpart W when the piston rod 40a is extended. The rear end 4 of workpart W serves as the reference locator by which it is positioned relative to the spindle 14. The slide 38 itself is moved in an axial direction by a relatively short stroke (e.g. 2 inch stroke) fluid cylinder 42 (e.g. pneumatic cylinder) that includes an axially movable and adjustable piston rod 42a fastened to an end of the fluid cylinder 40 to axially move fluid cylinder 40 on slide 38 when piston rod 42a is extended. Cylinder 42 is mounted on a flange of the L-shaped frame member 36b.

The load tube 32 is illustrated in FIG. 4 as comprising an air manifold 44 having inner and outer tubes defining an inner passage through which workparts to be machined are moved and an outer annular manifold or passage 45 that is closed off at one end by annular plug 46 and includes one or more air discharge orifices 47 formed in annular insert 48 at the other cantilevered end residing in spindle tube 17 proximate a tubular bushing 49 at the rear of the spindle 14. An inlet fitting 50 is provided to introduce compressed shop air (or other pressurized gas) into passage 45 for discharge through orifice(s) 47 to prevent dirt, machining chips, and the like from entering the load tube 32 and from remaining inside the workpart passage 2a when a hollow workpart is being machined. The orifices 47 can comprise an annular orifice or a plurality of circumferentially spaced apart individual orifices.

Figure 1:
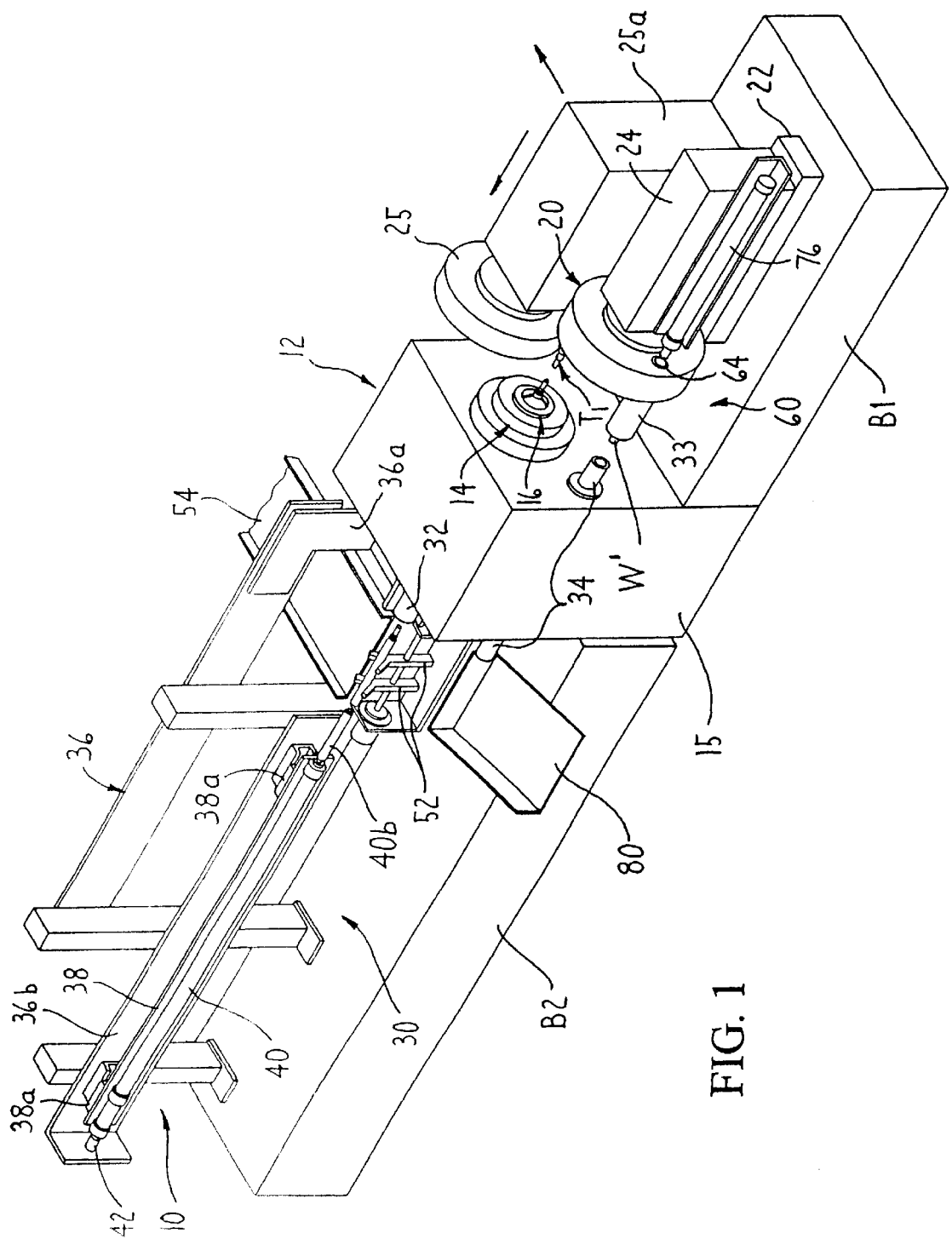
FIG. 1 is a perspective view of a loader and unloader mechanism pursuant to an embodiment of the invention for use with a CNC lathe.
Figure 2:
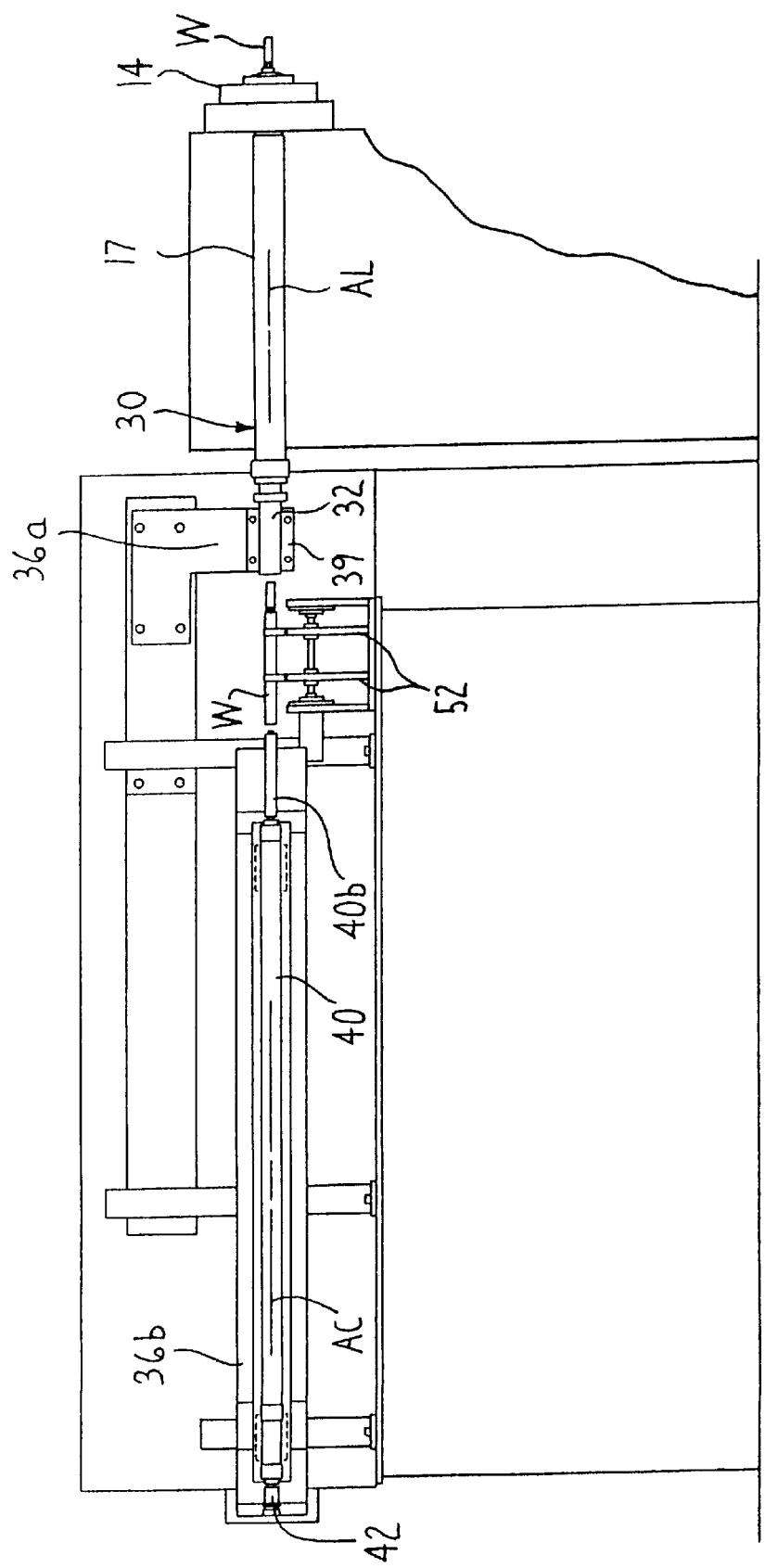
FIG. 2 is a partial elevational view of the load mechanism and lathe spindle.
Figure 3:
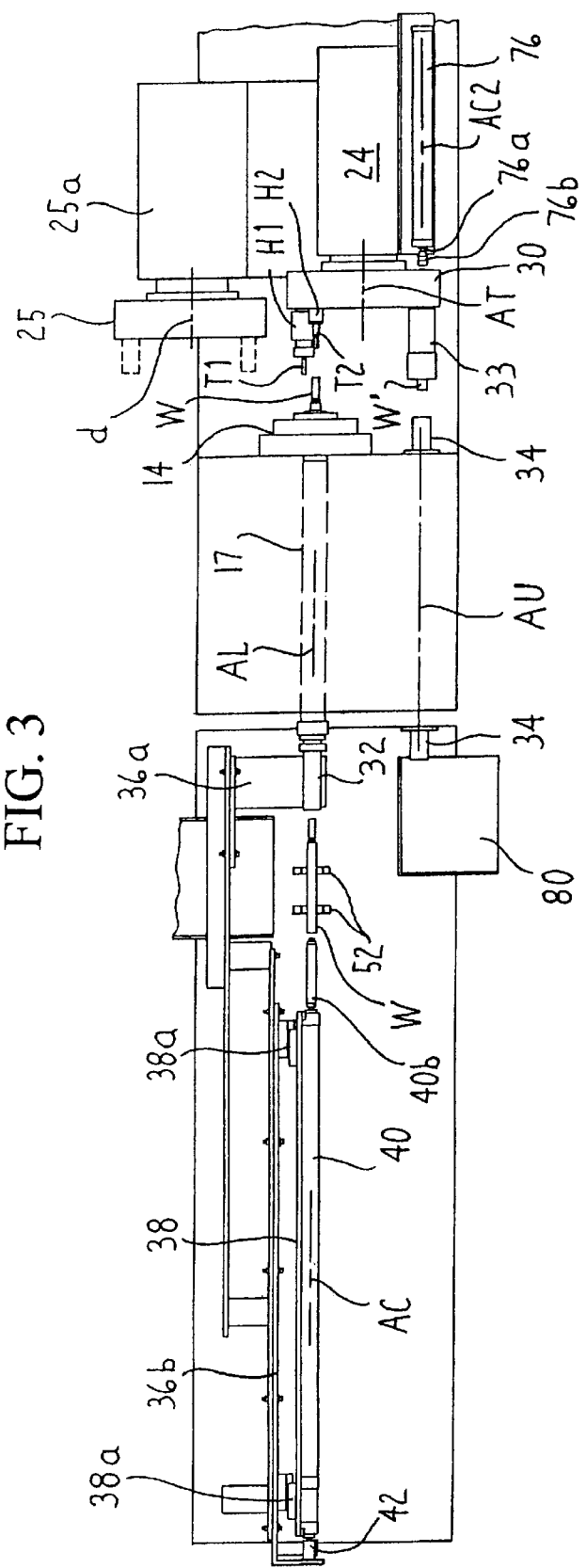
FIG. 3 is a plan view of the load and unload mechanism and lathe spindle.

The load tube 32 is coaxial with slots of fork shaped workpart supports 52 that receive individual workparts to be machined W from a gravity feed tray 54. In FIG. 2, one workpart W is shown received in slots of the supports 52 with the workpart longitudinal axis coaxial with the axis AL of the load tube 32 and spindle tube 17, the axis AC of the cylinders 40, 42, and the spindle rotational axis.

FIGS. 4 and 5A, 5B, and 5C illustrate the sequence of loading a workpart W into the spindle collet chuck 16. To load a workpart to be machined, the collet fingers 16a are opened by the hydraulic collet actuator that is provided on the commercially available lathe 10. Then, cylinder 40 is caused to extend its piston rod 40a to move the workpart to be machined W through the tubes 17, 32 into the open collet chuck fingers 16a to a first axial position P1 in a manner that ejects a previously machined workpart still residing in the chuck 16 from the front of the spindle 14 to the unloader mechanism 60 to be described below. The first axial position P1 is short of the final axial machining position P2 of the workpart in the collet chuck 16. Positioning of the workpart to be machined at first axial position P1 allows the workpart unloader mechanism 60 to be withdrawn from the spindle chuck 16 and allows the main turret 25 of the lathe to be rotated in a manner to position a spring stop 27 thereon in axial alignment with the next workpart to be machined. Then, the relatively short stroke cylinder 42 is caused to extend its piston rod 42a to move the slide 38 and the long stroke cylinder 40 thereon in axial manner to position the workpart to be machined W at the final second axial machining position P2 where workpart end 6 abuts the stop spring 27 of the main turret 25 and where the collet fingers 16a then can be closed on the workpart W to hold it for machining. The stroke of the short stroke cylinder 42 is accurately adjustable to this end by adjustment cylinder screw 42b. As mentioned above, positioning of the workpart in the collet chuck 16 is referenced to the rear end 4 of the workpart whose position is controlled by the short stroke of fluid cylinder 42.

Figures 6A, 6B:
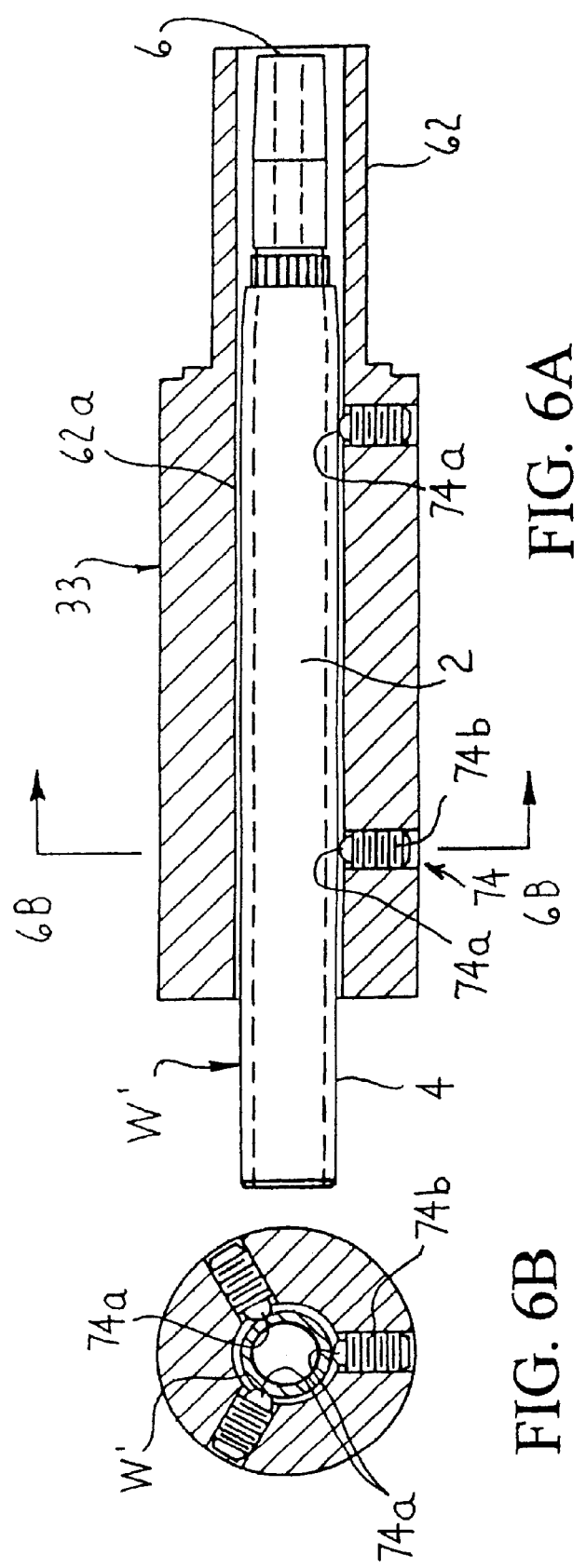
FIGS. 6A and 6B are respective longitudinal and transverse sectional views of the workpart holder carried on the tool turret, FIG. 6B being taken along lines 6B—6B of FIG. 6A.

The unloader mechanism 60 includes tool-carrying ram turret 20 that carries the aforementioned tools T1, T2 and also the tubular workpart holder 33 pursuant to the invention. In FIGS. 6A and 6B, the workpart holder 33 is shown including a reduced diameter shank 62 that is received in a cylindrical tubular bushing 64 provided pursuant to the invention in ram turret 20 to receive the workpart holder shank 62. The workpart holder 33 includes an internal longitudinal passage 62a sized diametrically to receive the machined workpart ejected from the collet chuck 16 by movement of the piston rod 40a of long stroke cylinder 40. In particular, the ram turret 20 is moved axially and rotatably to position the workpart holder 33 with its longitudinal axis in coaxial alignment with the longitudinal axis of the machined workpart and in close proximity (for example only, within 0.5 inch) to the end 6 of the machined workpart W' in the collet chuck 16 such that the machined workpart W' is pushed from the axial machining position P2 into the passage 62a when the collet fingers 16a are open and the fluid cylinder 40 advance its piston rod 40a. The workpart end 6 extends out of passage 62a, FIG. 6A. Two sets of three spring biased ball clamps 74 engage the workpart shank 2 to releasably retain it in the workpart holder 33. Each ball clamp 74 includes a ball 74a, an adjustable set screw 74b, and a spring therebetween (not shown). Then, the ram turret 20 is axially withdrawn away from the spindle chuck 16 and rotary indexed to position the workpart holder 33 in axial alignment with and proximity to the open end of unload tube 34 and also to a third fluid cylinder 76 (e.g. pneumatic cylinder) mounted on the ram turret axial slide 22. That is, the axis AU of the unload tube 34, axis AC2 of the fluid cylinder 76 and longitudinal axis of the workholder 33 are coaxial. The cylinder 76 is caused to extend its piston rod 76a such that the nosepiece 76b thereon is moved into the workpart holder passage 62a to engage the end 6 of the machined workpart and push the machined workpart W' from the workpart holder 33 into the unload tube 34 where previously unloaded machined workparts W' reside in end-to-end manner for travel through the unload tube 34 to a gravity discharge tray 80 of the lathe 12 such that each machined workpart unloaded into the unload tube 34 displaces a machined workpart at the opposite end of the unload tube 34 into the discharge tray 80.

Although the unload tube 34 is shown disposed in lathe housing 15 on a side of turret 20 adjacent the spindle 14 and extending parallel with the load tube 32 with the machined workparts W' moving therethrough in a direction (right to left in FIG. 1) opposite to that of the workparts to be machined in the load tube 32, the invention is not so limited. The unload tube 34 and fluid cylinder 76 can be reversed in position such that the unload tube 34 is disposed on a side of the turret 20 adjacent the slide 22 and the cylinder 76 is disposed adjacent the spindle 14 to unload machined workparts from left to right in FIG. 1.

While the invention is described above in terms of specific embodiments, it is not intended to be limited thereto but rather only to the extent set forth in the following claims.

What is claimed is:

1. A workpart loader mechanism for a machine tool having a workpart-holding spindle, comprising a load tube communicating to the spindle and first and second workpart loading fluid cylinders for moving a workpart to be machined to a first axial position relative to the spindle to eject a previously machined workpart therefrom and then to a second axial position where the workpart to be machined is positioned in the spindle for machining, said first fluid cylinder having a stroke selected to position the workpart to be machined at said first axial position and being disposed on an axial slide, said second fluid cylinder being positioned to move said slide and said first fluid cylinder thereon with a stroke selected to move the workpart to be machined from said first axial position to said second axial position.

2. The loader mechanism of claim 1 wherein said first and second fluid cylinders comprise relatively long and relatively short stroke fluid cylinders.

3. The loader mechanism of claim 1 wherein said load tube comprises a gas manifold having an inner passage through which the workparts are successively fed to the spindle and an outer passage disposed about said inner passage, said manifold having an inlet to said outer passage for receiving pressurized gas and one or more discharge orifices through which said pressurized gas is discharged from said outer passage toward the spindle.

4. A workpart unloader mechanism for a machine tool having a workpart-holding spindle, comprising a tool-carrying turret having a workpart holder thereon with the turret being axially and rotatably movable to a first turret position to receive a machined workpart ejected from said spindle and to a second turret position, a workpart unloading fluid cylinder for ejecting the machined workpart from said workpart holder at said second turret position, and an unload tube positioned to receive the machined workpart ejected from said workpart holder.

5. The unloader mechanism of claim 4 wherein said unload tube is positioned on one side of said turret and said fluid cylinder is positioned on another side of said turret.

6. A workpart loader and unloader mechanism for a machine tool having a workpart-holding spindle, comprising:

a loader mechanism including a load tube communicating to a rear of the spindle and first and second workpart loading fluid cylinders for moving a workpart to be machined to a first axial position relative to the spindle to eject a previously machined workpart therefrom and then to a second extended axial position where the workpart to be machined is positioned in the spindle for machining, said first fluid cylinder having a stroke selected to position the workpart to be machined at said first axial position and being disposed on an axial slide, said second fluid cylinder being positioned to move said slide and said first fluid cylinder thereon with a stroke selected to move the workpart to be machined from said first axial position to said second axial position, and an unloader mechanism comprising a tool-carrying turret having a workpart holder thereon, said turret being axially and rotatably movable to a first turret position to receive a machined workpart ejected from said spindle and to a second turret position, a third workpart unloading fluid cylinder for ejecting the machined workpart from said workpart holder at said second turret position, and an unload tube positioned to receive the machined workpart from said workpart holder.

7. The mechanism of claim 6 wherein said load tube comprises a gas manifold having an inner passage through which the workparts are successively fed to the spindle and an outer passage disposed about said inner passage, said manifold having an inlet to said outer passage for receiving pressurized gas and one or more discharge orifices through which said pressurized gas is discharged from said outer passage toward the spindle.

8. The mechanism of claim 6 wherein said unload tube is positioned on one side of said turret and said third fluid cylinder is positioned on the other side of said turret.

9. A method of loading and unloading a workpart relative to a workpart-holding spindle of a machine tool, comprising:

positioning a workpart to be machined relative to a load tube communicated to said spindle, actuating a first fluid cylinder to move said workpart to be machined at a first axial position relative to the spindle to eject a previously machined workpart therefrom, actuating a second fluid cylinder to move a slide and said first fluid cylinder thereon to position the workpart to be machined at a second axial position where the workpart to be machined is positioned in the spindle for machining, receiving in a workpart holder of a tool-carrying turret the previously machined workpart ejected from said spindle by movement of said workpart to be machined to said first axial position, moving said turret to a position where said workpart holder is positioned between a third workpart unloading fluid cylinder and an unload tube, and actuating said third fluid cylinder to eject the previously machined workpart from said workpart holder into said unload tube.

10. The method of claim 9 including flowing a pressurized gas through said load tube toward said spindle.

\* \* \* \* \*